United States Patent [19]

Lee

[11] Patent Number: 5,577,771
[45] Date of Patent: Nov. 26, 1996

[54] SUSPENSION SYSTEM FOR VEHICLE

[75] Inventor: Unkoo Lee, Kyungki-do, Rep. of Korea

[73] Assignee: Hyundai Motor Company, Seoul, Rep. of Korea

[21] Appl. No.: 358,544

[22] Filed: Dec. 14, 1994

[30] Foreign Application Priority Data

Dec. 14, 1993 [KR] Rep. of Korea ............... 93-27571

[51] Int. Cl.⁶ .................................................. B60G 3/00
[52] U.S. Cl. ................ 280/772; 280/690; 267/140.15; 267/218
[58] Field of Search .................. 267/140.12, 140.15, 267/218, 219, 35; 280/772, 673, 661, 690, 691, 717

[56] References Cited

U.S. PATENT DOCUMENTS 4,616,846  10/1986  Furuya et al. ............... 267/140.12 X
4,641,856  2/1987   Reichenbach ...................... 280/772
4,765,647  8/1988   Kondo et al. ................. 280/690 X
5,230,529  7/1993   Harvey-Bailey ............... 280/772 X

FOREIGN PATENT DOCUMENTS 3606961  9/1987  Germany ......................... 280/690
179320   9/1985  Japan ......................... 267/140.12
3231032  9/1988  Japan ......................... 267/140.12
2106421  4/1990  Japan ............................. 280/772

Primary Examiner—Josie Ballato
Attorney, Agent, or Firm—Birch, Stewart, Kolasch & Birch, LLP

[57] ABSTRACT

This invention relates to a suspension system which can improve controllability and stability of the vehicle and ride comfort by automatically controlling a height of a roll center in accordance with the vehicle's running conditions. To achieve this, a roll center control part for controlling a height of a roll center is provided between a vehicle body-side connecting portion of the lower arm and a vehicle body.

4 Claims, 4 Drawing Sheets

SUSPENSION SYSTEM FOR VEHICLE

BACKGROUND OF THE INVENTION

1. Field of the Invention

The present invention relates to a suspension system for a vehicle and, more particularly, to a suspension system which can improve controllability and stability of the vehicle and ride comfort by automatically controlling a height of a roll center in accordance the vehicle's running conditions.

2. Description of Related Art

The primary functions of a suspension system are to (1) provide vertical compliance so wheels can follow an uneven road, thereby isolating a vehicle body from roughness in the road, (2) maintain the wheels in proper steer and camber attitudes with respect to the road surface, (3) react to control forces produced by tires-longitudinal acceleration and braking forces, lateral force, and braking and driving torques, (4) resist roll of the vehicle body, and (5) keep the tires in contact with the road with minimal load variations.

Particularly, the roll occurs on the basis of a predetermined point, called a roll center, when the vehicle is cornering. The variation rate of the roll center's height has an effect on the running safety and handling safety of the vehicle.

That is, rolling of the vehicle occurs when the height of a gravitational center of the vehicle body becomes higher than that of the roll center. If lowering the height of the roll center, it is easy to optimize the camber and tread changes such that the vibration from the road can be minimized to improve the high speed straight running performance and safety as well as the ride comfort.

However, when lateral force is induced to the vehicle body during cornering, the vehicle body's behavior becomes cumbersome and deteriorates the handling safety.

On the contrary, if raising the height of the roll center, a resistance against the roll is increased, whereby a shorter anti-roll bar can be used. However, the camber and tread changes becomes large such that the ride comfort and the straight running safety are deteriorated.

Accordingly, it is very important to optimally set the height of the roll center by compromising between the two characteristics when designing the suspension system.

SUMMARY OF THE INVENTION

It is an object of the present invention to provide a suspension system which can improve controllability and stability of the vehicle and ride comfort by automatically controlling a height of a roll center in accordance with running conditions of the vehicle.

To achieve above object, the present invention provides a suspension system for a vehicle, including a roll center control means for controlling a height of a roll center, which is disposed between a vehicle body side connecting portion of the lower arm and a vehicle body.

The roll center control means includes an elastic member for controlling a height of the vehicle body side connecting portion of the lower control arm with a hydraulic pressure; a direction control valve for controlling a flowing direction of the hydraulic pressure generated from a hydraulic pump which is to be supplied to the elastic member; and an electronic control unit for controlling the direction control valve with a signal from a vehicle speed sensor and a lateral force sensor.

The elastic member has an elastic bushing disposed between inner and outer tubes and has two fluid chambers formed on respective upper and lower portions of the elastic bushing where the hydraulic pressure is selectively supplied. The elastic member is inserted in a bracket mounted on the vehicle body and fixed to the bracket by a fixed bolt which penetrates the inner tube. Each fluid chamber communicates with the direction control valve by means of a connecting tube.

BRIEF DESCRIPTION OF THE DRAWINGS

Further objects and other advantages of the invention will become apparent from the following description in conjunction with the attached drawings, in which.

DETAILED DESCRIPTION OF THE PREFERRED EMBODIMENTS

Figure 1:
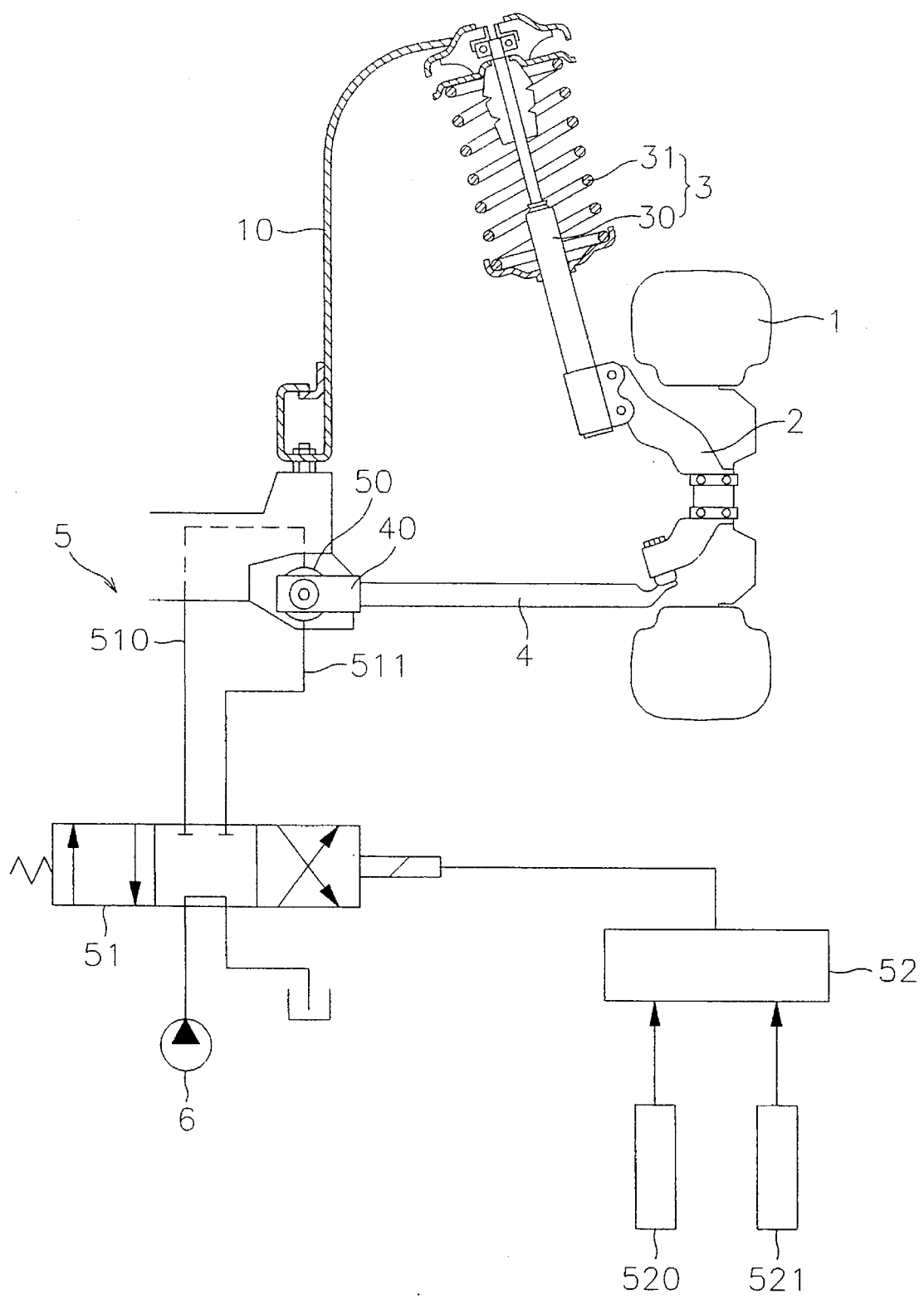
FIG. 1 is a schematic view of a suspension system in accordance with a preferred embodiment of the present invention.

FIG. 1 shows a schematic view of a suspension system in accordance with the present invention. The suspension system includes a wheel carrier 2 rotatably supporting a wheel 1; a strut assembly 3 consisting of a shock absorber 30 and a spring 31 and connecting the upper side of the wheel carrier 2 to a vehicle body 10; and a lower arm 4 connecting the lower side of the wheel carrier 2 to the vehicle body 10.

When the wheel 1 bumps and rebounds along the moving trace determined by a length of the lower arm 4, the strut assembly absorbs a shock caused by the bump and rebound of the wheel 1.

A roll center control part 5 is formed between the vehicle body-side connecting portion of the lower arm 4 and the vehicle body 10.

The roll center control part 5 comprises an elastic member 50 which can vary a position where the vehicle body side connecting portion of the lower arm 4 is connected; a direction control valve 51 for controlling a direction of a hydraulic pressure which is to be supplied to the elastic member 50; and an electronic control unit 52 which receives an electric signal from a vehicle speed sensor and lateral force sensor 520 and 521 and controls the direction control valve 51.

Figure 2:
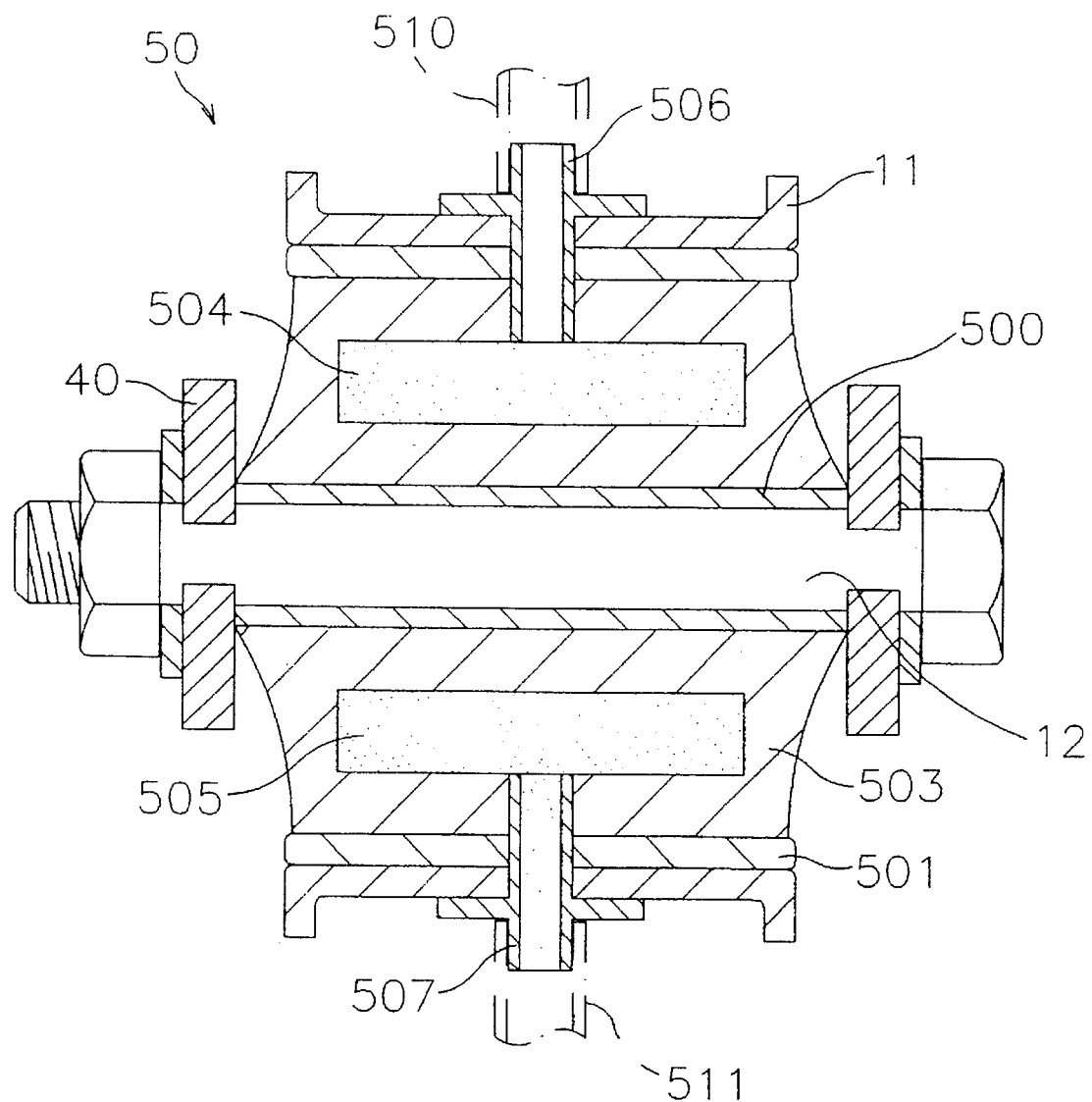
FIG. 2 is a sectional view of a bushing applied to the suspension system.

The elastic member 50, as shown in FIG. 2, comprises inner and outer tubes 500 and 501 and an elastic bushing 503 inserted between the inner and outer tubes 500 and 501. Upper and lower fluid chambers 504 and 505 are symmetrically formed within the elastic bushing 503.

The elastic member 50 is inserted into a bracket housing 11 mounted on the vehicle body 10 and connected to the vehicle body-side connecting portion 40 of the lower arm 4 by a fixing bolt 12 penetrating the inner tube 500.

Accordingly, the lower 4 arm smoothly moves upward and downward by a twisting elastic force of the elastic member 50.

The upper and lower fluid chambers 504 and 505 of the elastic member 50 communicate with connecting tubes 506 and 507, respectively, which are connected to the direction control valve 51 through respective fluid passages 510 and 511.

The direction control valve 51 which changes the direction of the hydraulic pressure which is to be supplied to the elastic member 50 is controlled by the electronic control unit 52 which compares the signal input from the vehicle speed sensor 520 and the lateral force sensor 521 with data preset in the electronic control unit 52.

In the suspension system as described above, when the vehicle is in the straight ahead position in a low speed range, the signal of the speed and running state sensed by the vehicle speed sensor 520 and the lateral force sensor 521 is transmitted to the electronic control unit 52 such that the hydraulic pressure is evenly supplied to the both upper and lower fluid chambers 504 and 505 by the direction control valve 51.

Figure 5:
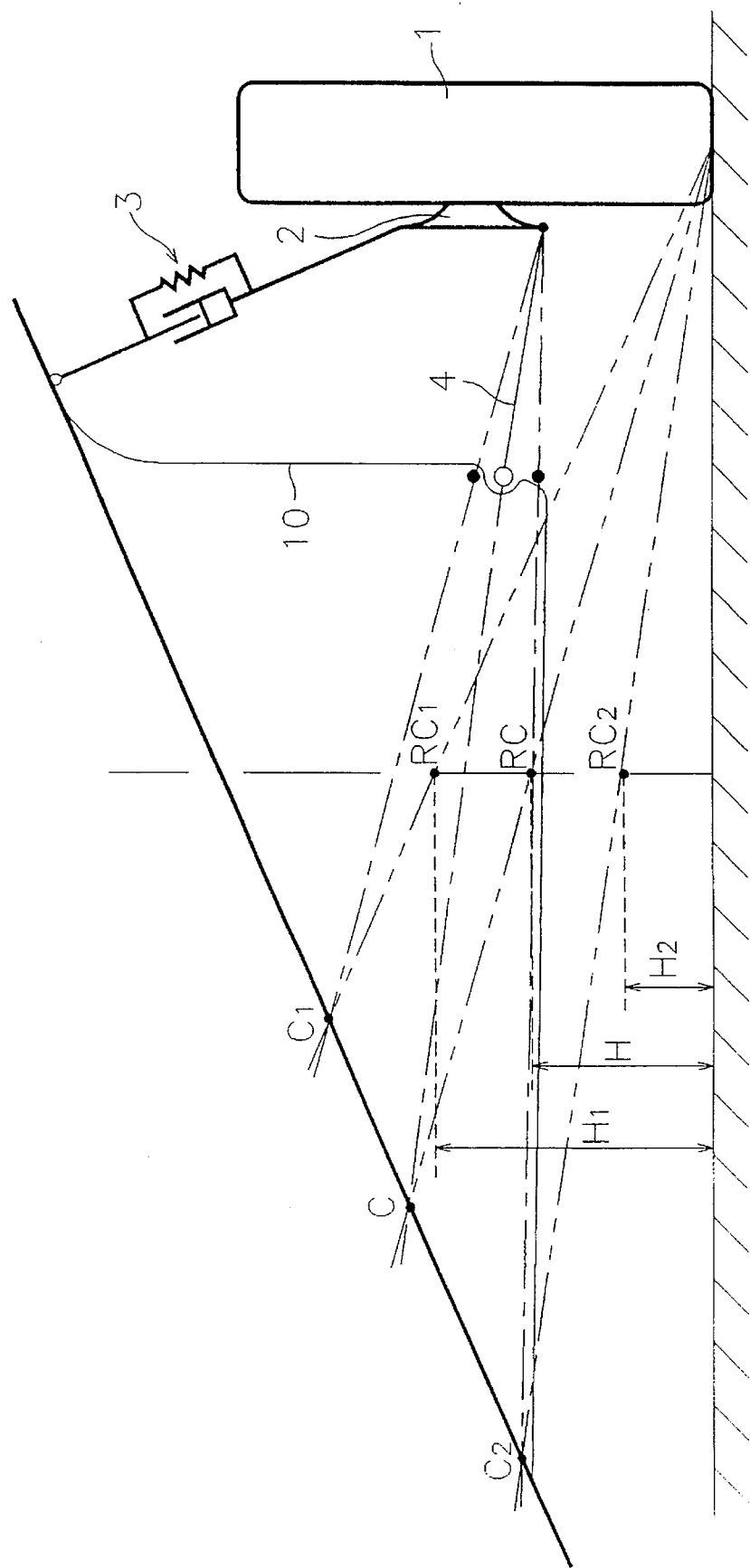
FIG. 5 is a schematic diagram showing an operating effect of the suspension system.

At this state, an intersecting point of a line which connects the wheel's instantaneous center C with respect to the vehicle body to the wheel's ground contacting portion and a center line CL of the vehicle body becomes a roll center RC, as shown in FIG. 5.

When the vehicle receives a lateral force occurring by a cornering or the like, a signal of this lateral force is transmitted from the lateral force sensor 521 to the electronic control unit 52.

Figure 3:
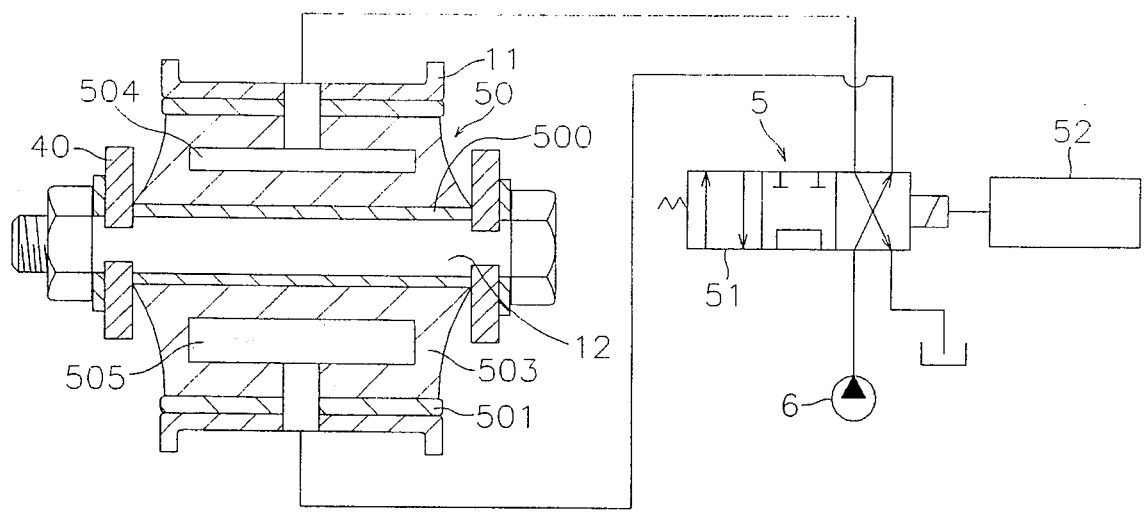
FIG. 3 is a partially schematic view of the suspension system illustrating how the suspension system of the embodiment may operate when the vehicle is in a turn.

The electronic control unit 52, as shown in FIG. 3, then controls the direction control valve 51 to supply the hydraulic pressure to the lower fluid chamber 505, thereby expanding this fluid chamber 505. And the hydraulic pressure within the upper fluid chamber is exhausted to heighten a position of the fixed bolt 12. Thus, the height H1 of an instantaneous center C1 of the wheel 1 with respect to the vehicle body becomes higher than the instantaneous center C at the straight ahead position in the middle or less speed range. Accordingly, the height H1 of the roll center RC1 becomes higher than the height H of the roll center RC, thereby increasing the stability of the roll and thus the stability of the vehicle.

Figure 4:
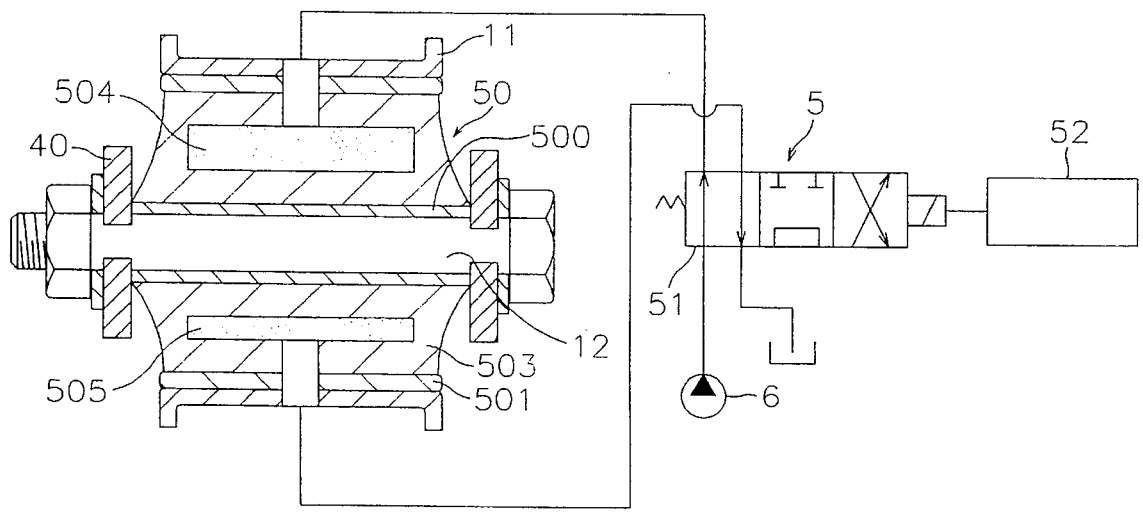
FIG. 4 is a partially schematic view of the suspension system illustrating how the suspension system of the first embodiment may operate when the vehicle is turning in a high speed range and running straight in the high speed range.

When the vehicle is in the straight ahead position in a high speed range, the electronic control unit 52 controls the direction control valve 51 as shown in FIG. 4. That is, the hydraulic pressure is supplied to the upper fluid chamber 504 to expand it and the hydraulic pressure within the fluid chamber 505 is exhausted to contract the fluid chamber 505.

As a result, the height of the fixed bolt 12 supporting the lower arm 4 is lowered such that the instantaneous center C2 of the wheel with respect to the vehicle body becomes lower than that of a straight ahead position. As a result, the height H2 of the roll center RC2 is lower than the height H of the roll center RC at the straight ahead position thereby obtaining the optimal camber change and minimizing the tread change.

If controlling the height of the mounting position of the lower control arms of each left and right wheel independently with an input logic, the location of the roll center can be more optimally controlled. Furthermore, if controlling the mounting position of the front and rear suspension, still additional optimal cornering performance can be obtained.

As described above, the suspension system of the present invention can improve controllability and stability of the vehicle and ride comfort by automatically controlling the height of the roll center in accordance with vehicle's running conditions.

What is claimed is:

1. A suspension system for a vehicle, comprising:
   a wheel carrier rotatable supporting a wheel;
   a strut assembly connecting an upper end of the wheel carrier to a vehicle body;
   a lower arm connecting a lower end of the wheel carrier to the vehicle body; and
   roll center control means for controlling a height of a roll center of the vehicle, said roll center control means being disposed between a vehicle body-side connecting portion of the lower arm and the vehicle body, said roll center control means including,
      an elastic member for controlling a height of the vehicle body-side connecting portion of the lower arm with hydraulic pressure,
      a direction control valve for controlling a flowing direction of the hydraulic pressure generated form a hydraulic pump which is to be supplied to the elastic member, and
      means for controlling the operation of said direction control valve.

2. The suspension system according to claim 1, wherein the elastic member has inner and outer tubes and an elastic bushing disposed between the inner and outer tubes and having two fluid chambers formed on respective upper and lower portions of the elastic bushing wherein the hydraulic pressure is selectively supplied, the elastic member being inserted in a bracket mounted on the vehicle body and fixed to the bracket by a fixing bolt which penetrates the inner tube, and each fluid chamber communicating with the direction control valve by means of a connecting tube.

3. The suspension system according to claim 1, wherein said means for controlling the operation comprises an electronic control unit controlling said direction control valve in response to both vehicle speed and lateral vehicle force.

4. The suspension system according to claim 3, wherein said electronic control unit receives signals from a vehicle speed sensor for detecting a current vehicle speed and outputting the signal corresponding to the current vehicle speed and from a lateral force sensor for detecting a lateral force of the vehicle and outputting the signal corresponding thereto.

* * * * *